United States Patent [19]

McClaughry

[11] Patent Number: 5,579,339
[45] Date of Patent: Nov. 26, 1996

[54] METHOD FOR CONCURRENT MONITORING OF MULTIPLE COMMUNICATIONS

[75] Inventor: Thomas J. McClaughry, Hoffman Estates, Ill.

[73] Assignee: Motorola, Inc., Schaumburg, Ill.

[21] Appl. No.: 223,414

[22] Filed: Apr. 4, 1994

[51] Int. Cl.$^6$ .................. H04B 1/38; H04L 5/16
[52] U.S. Cl. ............... 375/220; 375/224; 455/54.2; 370/498
[58] Field of Search .................. 375/224, 225, 375/222, 240, 377, 220; 455/54.1, 54.2; 370/94.1, 95.3, 84

[56] References Cited

U.S. PATENT DOCUMENTS 4,905,302  2/1990  Childress et al. .............. 455/54.2
5,014,345  5/1991  Comroe et al. ................ 455/54.1
5,091,906  2/1992  Reed et al. .................... 455/54.2
5,282,204  1/1994  Shpancer et al. ............... 455/54.2
5,299,198  3/1994  Kay et al. ..................... 370/95.3
5,327,581  7/1994  Goldberg ....................... 370/108

Primary Examiner—Stephen Chin
Assistant Examiner—Don Vo
Attorney, Agent, or Firm—Christopher P. Moreno

[57] ABSTRACT

A communication unit (103) transmits a concurrent monitoring request to a base station (102). Responsive to the concurrent monitoring request, the base station provides multiple communications from at least one dispatch position (101) and at least one other communication unit (104) to the communication unit. Upon reception of the multiple communications, the communication unit simultaneously renders the multiple communications audible, allowing an operator of the communication unit to concurrently monitor the multiple communications.

22 Claims, 2 Drawing Sheets

METHOD FOR CONCURRENT MONITORING OF MULTIPLE COMMUNICATIONS

FIELD OF THE INVENTION

The present invention relates generally to communication systems and, in particular, to a method for concurrent monitoring of multiple communications in a digital communication system.

BACKGROUND OF THE INVENTION

Communication systems can generally be divided into two broad classes: analog communication systems and digital communication systems. Both types of communication systems are known to comprise a plurality of communication units (e.g., in-car mobile and hand-held portable radios), base stations, and dispatch positions (e.g., consoles and console interface units). In an analog communication system, communications between users of the system typically comprise voice information, sourced by the communication units and/or the dispatch positions, represented throughout the system as analog signals. For example, when communicating with a particular communication unit, the audio supplied by the operator of the dispatch position is converted to an analog representation, which representation is sent to a base station and used to modulate a communication medium, such as a radio frequency (RF) channel. Upon reception of the modulated communication medium, the communication unit demodulates the communication medium to recover, and subsequently render audible, the analog representation of the audio information.

Alternately, digital communication systems often use a compressed digital representation in place of the analog representation described above. While digital representations of audio information offer many advantages over analog representations, they do present some disadvantages. Among these disadvantages is the difficulty in summing multiple audio sources together. For instance, in many analog communication systems, a communication unit may desire to concurrently monitor communications from both a dispatch position and other communication units. To accomplish this, a base station, acting as a repeater, electrically sums the multiple analog representations from the dispatch position and other communication units. The resulting summed analog representation is then transmitted to the communication unit, which renders the summed representation audible as previously described.

Such a summing technique, however, is not as easily implemented in digital communication systems utilizing compressed digital representations. Most compressed digital representations of audio information are not directly summable. That is, an audio source represented in a particular compressed digital format cannot be directly summed (e.g., through the use of digital addition) with another audio source using the same compressed digital format.

A solution to this summation problem is to decompress those signals intended for summation. Decompression of compressed digital signals converts them into a format allowing the direct summation of multiple signals. Thus, using the previous example of concurrent monitoring, the decompressed signals can be summed together and subsequently converted back into the compressed digital format for transmission to the monitoring communication unit. Once received by the communication unit, the compressed signal, comprising the summed audio information, is again decompressed an rendered audible.

A shortcoming, however, of this solution is that multiple compressions and decompressions of audio signals can significantly degrade their audio quality. Furthermore, the additional processing power required, as well as the added system throughput delay, make this solution prohibitive. Therefore, a method is needed which allows concurrent monitoring of multiple communications to be performed by a communication unit in a digital communication system utilizing a compressed digital format.

DESCRIPTION OF A PREFERRED EMBODIMENT

Generally, the present invention provides a method, within a digital communication system, for a communication unit to concurrently monitor communications from at least one other communication unit and at least one dispatch position. This result is achieved by the communication unit transmitting a concurrent monitoring request to a base station. Responsive to this request, the base station provides communications from the at least one communication unit and the at least one dispatch position to the communication unit. Upon reception, the communication unit simultaneously renders the communications audible for presentation to an operator of the communication unit.

In an alternate embodiment, the at least one dispatch position can transmit a concurrent monitoring command to the base station, which command specifies a communication unit as a concurrently monitoring communication unit. Responsive to this command, the base station provides communications from the at least one communication unit and the at least one dispatch position to the concurrently monitoring communication unit. Upon reception, the concurrently monitoring communication unit simultaneously renders the communications audible for presentation.

Such methods allow an operator of a communication unit to concurrently monitor digital communications without the need for multiple compressions and decompressions of the digital communications.

Figure 1:
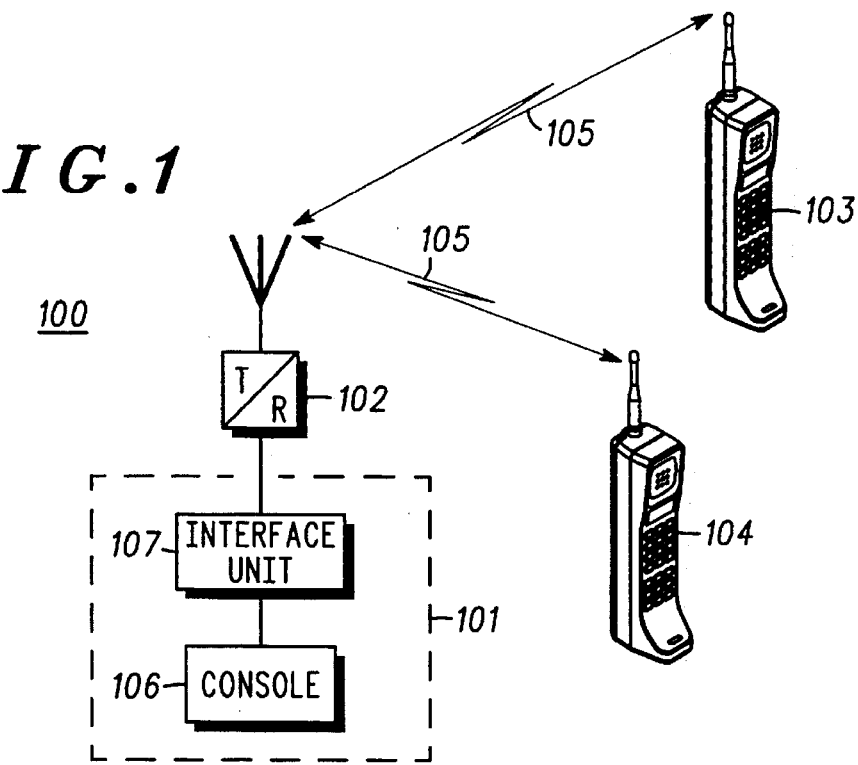
FIG. 1 illustrates a digital communication system in accordance with the present invention.

The present invention can be more fully described with reference to FIGS. 1–4. FIG. 1 illustrates a digital communication system (100), such as a conventional or trunked digital communication system, that includes a dispatch position (101), a base station (102), communication units (103, 104), and communication resources (105).

The dispatch position (101) includes a console (106) and an interface unit (107). The console (106), which may be an ASTRO™ CENTRACOMM™ Console by Motorola, Inc., accepts user information such as voice or data messages and constructs a signal suitable for further processing in the digital communication system (100). The interface unit (107), which may be an ASTRO™ DIGITAL INTERFACE UNIT™ by Motorola, Inc., acts as a "bridge" (i.e., formatting of signals, etc.) between the console (106) and the base station (102). It is understood that the dispatch position (101) could comprise a single element, in which case the functionality of the interface unit (107) and the console unit (106) would be combined.

The base station (102), which may be an ASTRO™ QUANTAR™ Base Station by Motorola, Inc., transceives the communication resources (105) to perform both repeater operations (i.e., communication unit to/from communication unit) and dispatch operations (i.e., dispatch position to/from communication unit). The communication resources (105) may be multiple RF channels such as pairs of frequency carriers, time division multiplex (TDM) slots, or any other RF transmission media. The base station (102) is capable of receiving control messages from either the dispatch position (101) and/or the communication units (103, 104).

The communication units (103, 104), which may comprise ASTRO™ SABER™ portable and mobile radios by Motorola, Inc., act as both origination and destination points for digital messages in the communication system (100). It is hereafter assumed that voice information transferred between the dispatch position (101), the base station (102), and the communication units (103, 104) comprises packet-switched, variable-rate, compressed digital audio, such as audio information compressed through the use of a VSELP (Vector Sum Excited Linear Prediction) or IMBE™ (Improved Multi-Band Excitation) encoder. In the context of the present invention, compressed digital audio is variable-rate if the number of bits used in the representation can be varied. For instance, digital audio compressed via a VSELP algorithm may comprise 4800 bits per second (bps), 3600 bps, or any of a number of other similar rates.

To illustrate normal operation of the digital communication system (100), a repeated communication may be initiated by a communication unit (103, 104). In a conventional digital communication system, the communication, as well as any prefixal and/or suffixal control information, is immediately transmitted to the base station (102). In a trunked digital communication system, an inbound signaling word (ISW) requesting usage of a communications channel is transmitted to the base station (102) via a control channel. When a communications channel becomes available, the base station (102) transmits an outbound signaling word (OSW) to the initiating communication unit (103, 104) granting access to a communication channel. Once received by the base station (102), the communication is re-transmitted (i.e., repeated) such that the targeted communication units may receive the communication. The targeted communication unit may likewise communicate with the initiating communication unit.

In the case of a dispatch communication, a communication is initiated by the console (106) and relayed to the base station (102) in a compressed digital format by the interface unit (107). The base station (102) transmits the communication to those communication units (103, 104) intended to receive the communication. As previously discussed, there are instances when a particular communication unit may request, or is designated, to concurrently monitor multiple communications.

Figure 2:
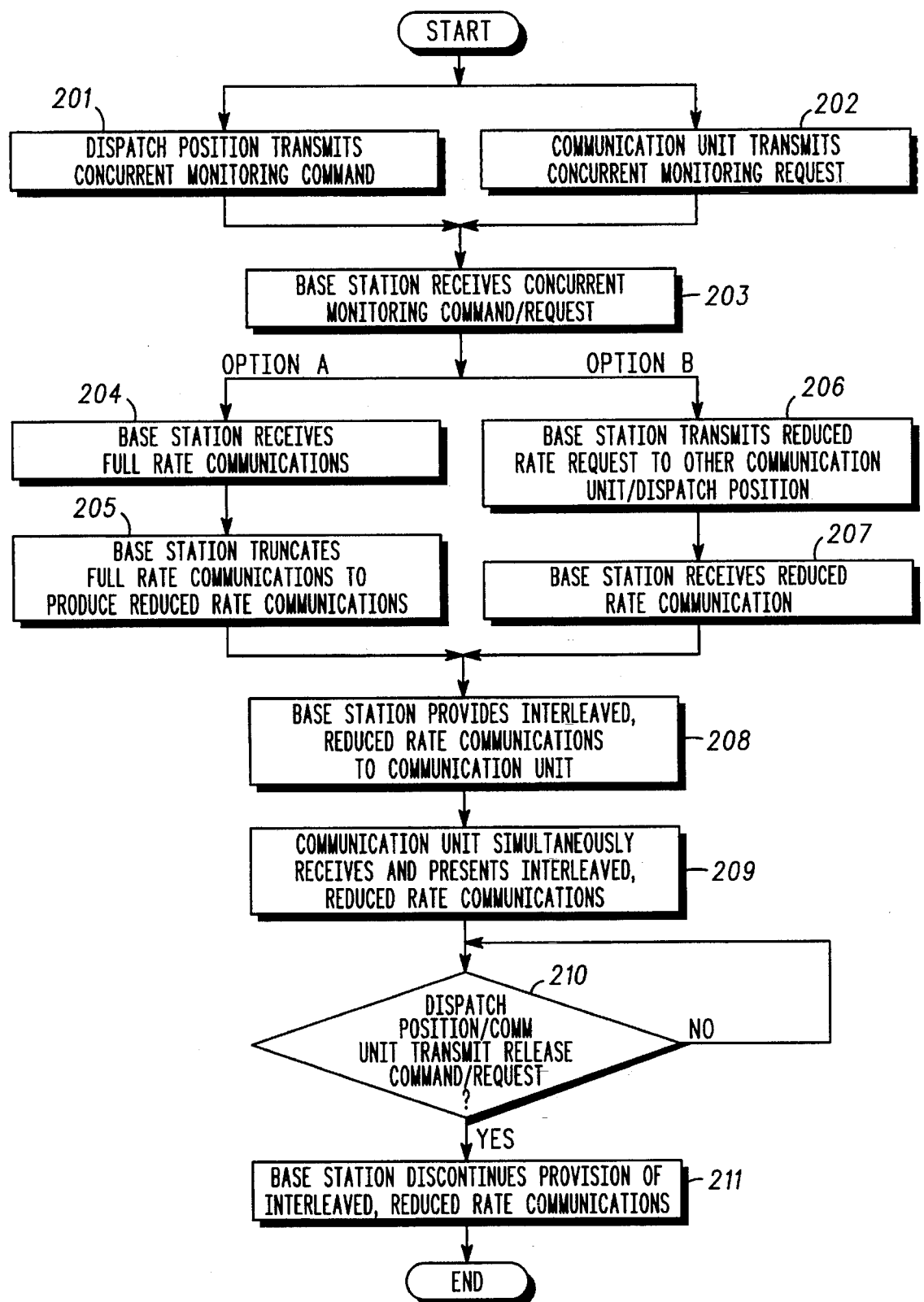
FIG. 2 illustrates a flow diagram which may be incorporated in communication system in accordance with the present invention.

FIG. 2 illustrates a flow diagram that may be incorporated in the digital communication system (100) to provide concurrent monitoring capability in accordance with the present invention. In the following description, compressed digital communications are assumed to comprise packets, as are well known in the art. Thus, the term "full rate communications" hereinafter refers to compressed digital communications comprising full bit rate packets, which packets utilize the maximum number of bits per second allowed by a particular compression algorithm and hence, the full transmission bandwidth provided by a base station. Similarly, a "reduced rate communication" hereinafter refers to a compressed digital communication comprising reduced bit-rate packets, which packets utilize less than the maximum number of bits per second and hence, less than the full transmission bandwidth provided by a base station. While the description below only discusses the case of two communications being concurrently monitored, the present invention can be extended to higher numbers of multiple communications.

Concurrent monitoring by a communication unit can be initiated in one of two methods. In a first method, a dispatch position can transmit, to a base station, a concurrent monitoring command (201), e.g., an MDC™ control message, indicating identification of a concurrently monitoring communication unit. Also, the concurrent monitoring command may include identification of at least one other communication unit, specifically indicating to the base station those communication units to be monitored in addition to the dispatch position. If other communication units are not specifically identified in the concurrent monitoring command, a default set of other communication units can be used.

In a second method, a communication unit can transmit, to the base station, a concurrent monitoring request (202). The concurrent monitoring request may comprise an ISW that includes identification of the requesting communication unit. Also, the concurrent monitoring request may include identification of at least one other communication unit and at least one dispatch position, specifically indicating to the base station those communication units and dispatch positions to be monitored by the requesting communication unit. If other communication units and/or dispatch positions are not specifically identified in the concurrent monitoring request, a default set of other communication units and/or dispatch positions can be used.

Upon receipt of the concurrent monitoring command or request by the base station (203), two methods may be used to provide the multiple communications to the communication unit. As a first method for providing multiple communications, the base station can perform those steps indicated by "Option A" in FIG. 2.

At step 204, the base station receives full-rate communications from the required dispatch position and other communication unit. As previously mentioned, these full-rate communications each singularly occupy the entire available bandwidth such that no additional capacity would be available if they were to be individually transmitted/repeated by the base station. Some compression algorithms, such as IMBE™, however, allow compressed digital voice information to be selectively truncated. Such truncation results in a variable-rate representation that occupies less of the available transmission bandwidth while delivering suboptimal, but still highly acceptable, speech quality upon decompression. Several compression algorithms, including IMBE™, have demonstrated excellent performance while utilizing bandwidths less then half their typical allocation.

Assuming the use of such a variable-rate compression algorithm, the base station can truncate the full-rate communications from both the dispatch position and the other communication unit to produce reduced rate communications (205). The reduced rate communications are then interleaved and provided to the concurrently monitoring communication unit (208). The manner in which the reduced rate communications are interleaved is based at least in part upon the packet size resulting from the compression algorithm. Whereas a single full-rate communication would occupy the entire transmission bandwidth, the interleaved communication, as described above, allows multiple reduced rate communications to be provided to the concurrently monitoring communication unit.

As a second method for providing multiple communications to the communication unit, the base station can perform those steps indicated by "Option B" in FIG. 2. Upon receiving the concurrent monitoring command or request (203), the base station transmits a reduced rate request (206) to the other communications units and optionally to the at least one dispatch position to be monitored. The present invention anticipates that if a concurrent monitoring command is sent by the dispatch position, the base station would not be required to send the reduced rate request to the dispatch position. If a communication unit transmits a concurrent monitoring request, the other communication units and the dispatch position would receive the reduced rate request.

The reduced rate request instructs the other communications unit and the dispatch position that a reduced rate format is desired. In the same manner as described in step 205, the other communication unit and the dispatch position transform their respective full-rate communications into reduced-rate communications through truncation of the compressed digital signal. Both the dispatch position and communication unit subsequently transmit only reduced-rate communications to the base station, until they are either instructed to revert back to full-rate communications or a predetermined system condition occurs. Examples of such a predetermined condition are a system-wide reset instruction or expiration of a predetermined period of time subsequent to reception of the reduced rate request.

Reduced rate communications transmitted by the dispatch position and the other communication unit are received by the base station unit (207). Regardless of whether the "Option A" path or the "Option B" path is used, the reduced-rate communications are interleaved and transmitted (208) to the concurrently monitoring communication unit.

Upon receiving the multiple, that is to say, interleaved, communications, the concurrently monitoring communication unit simultaneously decompresses the multiple communications and presents them (209). This step is performed by de-interleaving the multiple communications and decompressing them according to the particular algorithm used to originally compress them. In a preferred embodiment, the multiple, decompressed communications are then summed to create a single summed communication comprising the multiple communications. The summed communication is then rendered audible in the same manner as with a typical, full-rate communication.

The provision, reception, and presentation of multiple communications, as described above, continues until reception, by the base station, of a concurrent monitoring release request or command (210). A concurrent monitoring release request transmitted in the form of an ISW or similar control instruction by the concurrently monitoring communication unit, instructs the base station to discontinue provision of the interleaved communications (211). Similarly, a concurrent monitoring release command, transmitted by the dispatch position that originally transmitted the concurrent monitoring command, also instructs the base station to discontinue provision of the interleaved communications (211). In either case, the base station reverts back to the provision of full-rate communications. In the event that "Option B" was use to provide reduced-rate communications, the base station may transmit a full-rate request to the other communications units and, optionally, the dispatch position indicating that they should revert to a full-rate communications mode.

Figure 3:
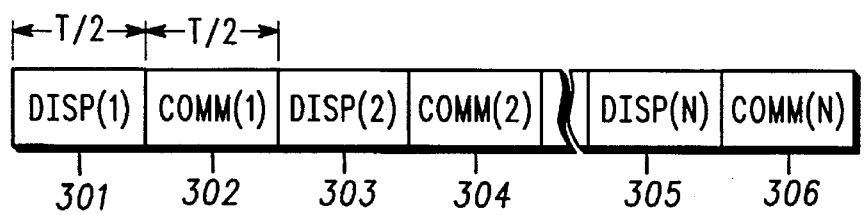
FIG. 3 illustrates an exemplary embodiment of interleaved communications.
Figure 4:
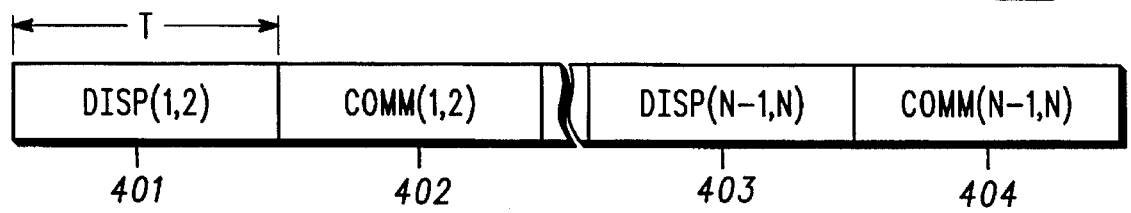
FIG. 4 illustrates an alternate embodiment of interleaved communications.

FIGS. 3 and 4 illustrate two possible embodiments of the interleaved communications discussed above. In FIG. 3, there are shown N reduced bit-rate packets corresponding to the dispatch position (301, 303, 305) and N reduced bit-rate packets corresponding to the other communication unit (302, 304, 306). Assuming an available transmission bandwidth described by the period T, the reduced bit-rate packets (301–306), in a preferred embodiment, each occupy a portion of the available bandwidth described by the period T/2. It is understood that unequal amounts of the available bandwidth could also be assigned to the reduced bit-rate packets (301–306) provided that the overall transmission bandwidth is not exceeded.

FIG. 4 depicts an interleaving scheme that concatenates reduced bit-rate packets from each reduced-rate communication to create concatenated packets (401–404) such that each concatenated packet occupies the full available transmission bandwidth T. As shown, the concatenated packets (401, 403) corresponding to the dispatch position are then interleaved with the concatenated packets (402, 404) corresponding to the other communication unit. As before, it is understood that unequal amounts of the available bandwidth could also be assigned to the concatenated packets (401–404) provided that the overall transmission bandwidth is not exceeded. In either scheme, multiple communications are interleaved so as to use the same amount of available transmission bandwidth as would have been used by a single full-rate communication.

The present invention provides a method for a communication unit to concurrently monitor communications from at least one other communication unit and at least one dispatch position. With such a method, the significantly degraded audio quality, added processing, and increased throughput delays inherent in previous solutions are substantially eliminated. This goal is achieved through the use of interleaved, reduced-rate communications. In this manner, audio information from a dispatch position and another communication unit are made available to a concurrently monitoring communication unit.

I claim:

1. In a digital communication system that includes a plurality of digital communication units, at least one dispatch position, and a base station, a method for a communication unit of the plurality of digital communication units to concurrently and audibly monitor voice information from multiple communications from at least one other communication unit of the plurality of digital communication units and the at least one dispatch position, the method comprising the steps of:

a) transmitting, by the communication unit, a concurrent monitoring request to the base station;

b) responsive to the concurrent monitoring request, providing, by the base station, multiple communications from the at least one dispatch position and the at least one other communication unit to the communication unit, each of said multiple communications containing voice information; and c) by the communication unit, simultaneously rendering the multiple communications containing voice information audible to an operator of the communication unit such that said operator of the communication unit can concurrently and audibly monitor voice information from the multiple communications.

2. The method of claim 1, wherein step (a) further comprises the step of transmitting the concurrent monitoring request to include identification of the at least one other communication unit and the at least one dispatch position.

3. The method of claim 1, wherein step (b) further comprises the steps of:
  b1) interleaving each communication of the multiple communications, wherein each communication comprises reduced bit-rate packets, to produce interleaved communications such that the interleaved communications do not exceed a transmission bandwidth of the base station; and
  b2) providing the interleaved communications to the communication unit as the multiple communications.

4. The method of claim 3, wherein step (b1) further comprises the step of interleaving the multiple communications, wherein each communication comprises packet-switched, variable-rate, compressed digital audio encoded with an IMBE™ (Improved Multi-Band Excitation) encoder.

5. The method of claim 4, wherein step (c) further comprises the steps of:
  c1) simultaneously decompressing each communication to produce decompressed communications;
  c2) summing the decompressed communications to produce a summed communication; and
  c3) rendering audible the summed communication.

6. The method of claim 1 further comprising the steps of:
  d) transmitting, by the communication unit, a concurrent monitoring release request to the base station; and
  e) responsive to the concurrent monitoring release request, discontinuing, by the base station, provision of the multiple communications to the communication unit.

7. In a digital communication system that includes a plurality of digital communication units, at least one dispatch position, and a base station, a method for a communication unit of the plurality of digital communication units to concurrently and audibly monitor voice information from multiple communications from at least one other communication unit of the plurality of digital communication units and the at least one dispatch position, the method comprising the steps of:
  a) transmitting, by the at least one dispatch position, a concurrent monitoring command to the base station, wherein the concurrent monitoring command specifies a communication unit of the plurality of communication units as a concurrently monitoring communication unit;
  b) responsive to the concurrent monitoring command, providing, by the base station, the multiple communications from the at least one dispatch position and the at least one other communication unit to the communication unit, each of said multiple communications containing voice information; and
  c) by the communication unit, simultaneously rendering the multiple communications containing voice information audible to an operator Of the communication unit, such that said operator of the communication unit can concurrently and audibly monitor voice information from the multiple communications.

8. The method of claim 7, wherein step (a) further comprises the step of transmitting the concurrent monitoring command to include identification of the at least one other communication unit.

9. The method of claim 7, wherein step (b) further comprises the steps of:
  b1) interleaving each communication of the multiple communications, wherein each communication comprises reduced bit-rate packets, to produce interleaved communications such that the interleaved communications do not exceed a transmission bandwidth of the base station; and
  b2) providing the interleaved communications to the communication unit as the multiple communications.

10. The method of claim 9, wherein step (b1) further comprises the step of interleaving the multiple communications, wherein each communication comprises packet-switched, variable-rate, compressed digital audio encoded with an IMBE™ (Improved Multi-Band Excitation) encoder.

11. The method of claim 10, wherein step (c) further comprises the steps of:
  c1) simultaneously decompressing each communication to produce decompressed communications;
  c2) summing the decompressed communications to produce a summed communication; and
  c3) rendering audible the summed communication.

12. The method of claim 7 further comprising the steps of:
  d) transmitting, by the at least one dispatch position, a concurrent monitoring release command to the base station; and
  e) responsive to the concurrent monitoring release command, discontinuing, by the base station, provision of the multiple communications to the communication unit.

13. A method for a digital communication unit to simultaneously receive voice information from multiple communications, the method comprising the steps of:
at the digital communication unit:
  a) receiving an interleaved communication that includes multiple communications, each of said multiple communications containing voice information, wherein each communication of the multiple communications comprises packet-switched, variable-rate, compressed digital audio;
  b) simultaneously decompressing each communication of said multiple communications to produce decompressed communications;
  c) summing the decompressed communications to produce a summed communication; and
  d) rendering audible the summed communication to an operator of the communication unit so that said operator can concurrently and audibly monitor voice information from the multiple communications.

14. A method for a base station to simultaneously provide multiple communications to a digital communication unit, the method comprising the steps of:
at the base station:
  a) receiving, from the digital communication unit, a concurrent monitoring request, wherein the concurrent monitoring request includes identification of at least one dispatch position and at least one other digital communication unit;
  b) receiving full-rate communications containing voice information from the at least one dispatch position and receiving full-rate communications containing voice information from the at least one other digital communication unit;

c) responsive to the concurrent monitoring request, truncating at least a portion of the full-rate communications containing voice information from the at least one dispatch position and the full-rate communications containing voice information from the at least one Other digital communication Unit to produce reduced-rate communications; and d) responsive to the concurrent monitoring request, providing the reduced-rate communications as the multiple communications to the digital communication unit, the multiple communications containing voice information from the at least one dispatch position and voice information from the at least one other digital communication unit.

15. The method of claim 14, wherein step (d) further comprises the steps of:

d1) interleaving the reduced-rate communications to produce interleaved communications such that the interleaved communications do not exceed a transmission bandwidth of the base station; and d2) providing the interleaved communications to the digital communication unit as the multiple communications.

16. A method for the base station to simultaneously provide multiple communications to a digital communication unit, the method comprising the steps of:
at the base station:

a) receiving, from at least one dispatch position, a concurrent monitoring command, wherein the concurrent monitoring command includes identification of at least one other digital communication unit;

b) receiving full-rate communications containing voice information from the at least one dispatch position and receiving full-rate communications containing voice information from the at least one other digital communication unit;

c) responsive to the concurrent monitoring command, truncating at least a portion of the full-rate communications containing voice information from the at least one dispatch position and the full-rate communications containing voice information from the at least one other digital communication unit to produce reduced-rate communications; and d) responsive to the concurrent monitoring command, providing the reduced-rate communications as the multiple communications to the digital communication unit, the multiple communications containing voice information from the at least one dispatch position and voice information from the at least one other digital communication unit.

17. The method of claim 16, wherein step (d) further comprises the steps of:

d1) interleaving the reduced-rate communications to produce interleaved communications such that the interleaved communications do not exceed a transmission bandwidth of the base station; and d2) providing the interleaved communications to the digital communication unit as the multiple communications.

18. A method for a base station to provide multiple communications to a digital communication unit, the method comprising the steps of:
at the base station:

a) receiving, from the digital communication unit, a concurrent monitoring request;

b) transmitting, responsive to the concurrent monitoring request, a reduced-rate request to at least one other digital communication unit and at least one dispatch position, wherein the reduced-rate request specifies a reduced bit-rate for communications originated by the at least one other digital communication unit and the at least one dispatch position;

c) receiving reduced-rate communications containing voice information from the at least one other digital communication unit and receiving reduced-rate communications containing voice information from the at least one dispatch position; and d) providing the reduced-rate communications as the multiple communications to the digital communication unit, the multiple communications containing voice information from the at least one other digital communication Unit and voice information from the at least one dispatch position.

19. The method of claim 18, wherein step (a) further comprises the step of receiving the concurrent monitoring request that includes identification of the at least one other digital communication unit and the at least one dispatch position.

20. The method of claim 18, wherein step (d) further comprises the steps of:

d1) interleaving the reduced-rate communications to produce interleaved communications such that the interleaved communications do not exceed a transmission bandwidth of the base station; and d2) providing the interleaved communications to the digital communication unit as the multiple communications.

21. The method of claim 18 further comprising the steps of:

e) receiving a concurrent monitoring release request; and f) responsive to the concurrent monitoring release request, discontinuing provision of the multiple communications to the digital communication unit.

22. The method of claim 21 further comprising the step of:

g) responsive to the concurrent monitoring release request, transmitting a full-rate request to the at least one other digital communication unit and the at least one dispatch position.

* * * * *